United States Patent Office 2,807,854
Patented Oct. 1, 1957

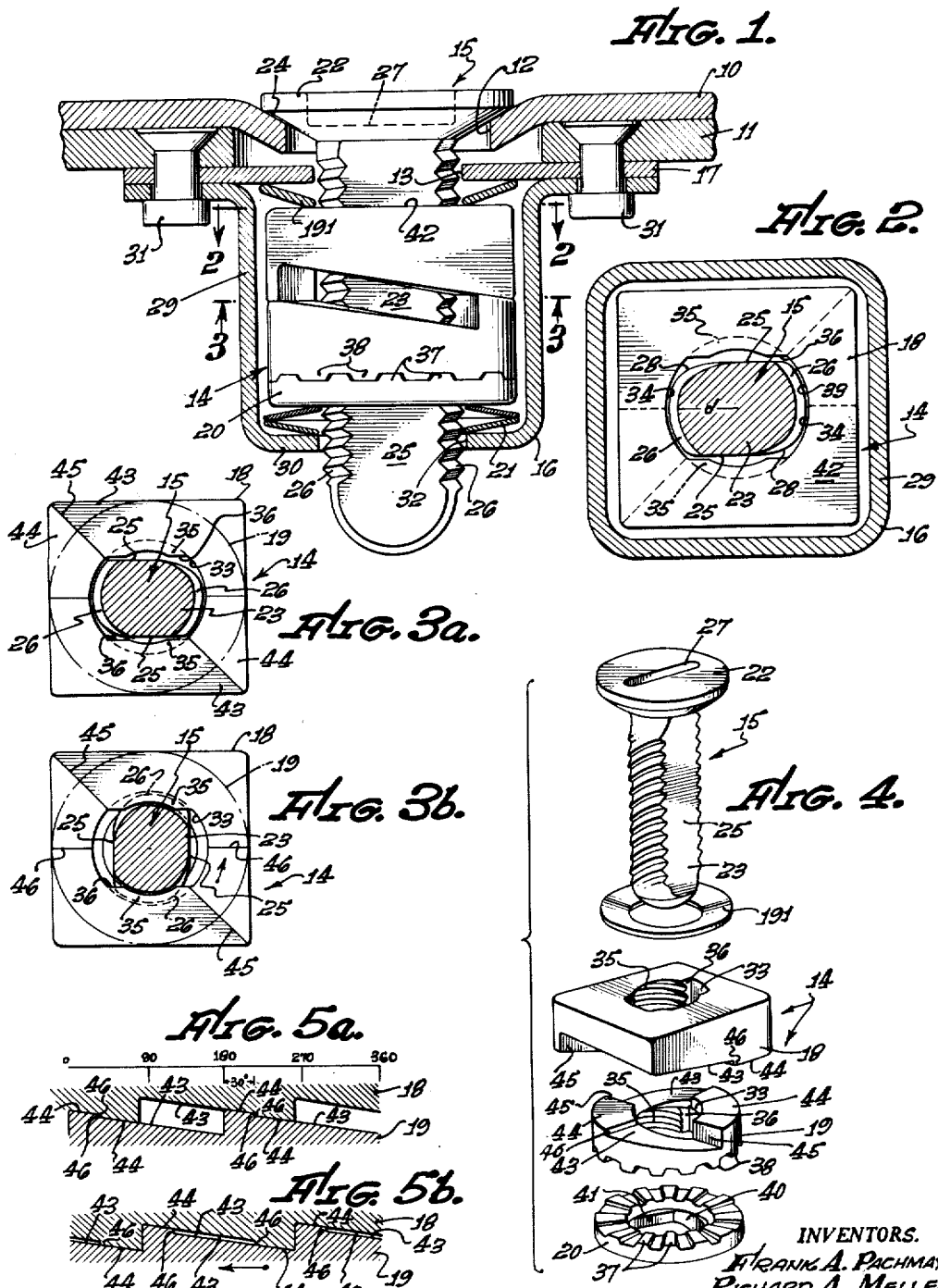

2,807,854

DOUBLE NUT FASTENER

Richard A. Mellen and Frank A. Pachmayr, Culver City, Calif.

Application May 16, 1955, Serial No. 508,360

20 Claims. (Cl. 24—221)

This invention relates to improved fasteners of the quick operating type, in which a stud and nut assembly may be fastened together or released with less relative rotation than is required for a conventional stud and nut, and usually with considerably less than a single turn of the stud.

A major object of the invention is to provide a quick operating fastener of this type, which is capable in its made up condition of forming a fastening entirely free of play or looseness. Such a very positive and tight fastening is desirable, for example, for securing inspection plates, cowlings, and the like to the outside of high speed jet aircraft, in which the wind velocities encountered would act to separate parts retained only by the usual spring pressed type of quick fastener.

A fastener formed in accordance with the invention includes a stud and an engageable nut assembly including two relatively rotatable nuts. The stud and both nuts are provided with interrupted threads or equivalent shoulders, so that each of the nuts meshes in holding relation with the stud only during a portion of a turn. One of the nuts is rotatable relative to the other between a first position in which the threads or shoulders on the nuts are sufficiently alined axially to allow free axial movement of the stud directly into and out of the nuts, and a second position in which the threads are complementary and form together a composite nut structure whose threads will engage and hold the stud throughout an increased angular extent and preferably a complete turn. The nuts may be actuable between these positions by the stud itself, preferably during an initial portion of a tightening or releasing rotation. In making up the fastener, the stud is first inserted axially into the nut assembly, and is then turned to a tightened condition. The first portion of this turning motion, preferably the first 90°, serves to turn one of the nuts relative to the other to a complementary position, following which further rotation of the stud acts to tighten the stud relative to both of the nuts which then act essentially as a single circularly continuous nut.

Stop means are provided for limiting the relative rotation of the nuts at the desired complementary and alined positions respectively. Preferably, the stud actuates the movable nut relative to the other by means of an element in the nut assembly which is keyed for rotation with the stud, and has a slip connection with the nut. After the initial shifting movement of the nut has been effected, this element then slips relative to both of the nuts during subsequent tightening rotation of the stud. This element may be spring pressed against one of the nuts, and desirably turns that nut by means of a series of driving teeth, or shoulders.

A further feature of the invention resides in the provision of means for camming the nuts relatively toward and away from each other in response to relative rotation of the nuts, in a manner always maintaining the threads of one nut in a proper stud engaging relation to the threads of the other nut. This camming action may be effected by suitable cam surfaces on the nuts themselves, which surfaces preferably have a lead or pitch substantially equal to the lead of the stud and nut threads (but in a reverse direction).

The above and other features and objects of the present invention will be better understood from the following detailed description of the typical embodiment illustrated in the accompanying drawing, in which:

Fig. 1 is a section through a fastener constructed in accordance with the present invention;

Fig. 2 is a transverse section taken on line 2—2 of Fig. 1;

Figs. 3a and 3b are reduced views taken on line 3—3 of Fig. 1, the Fig. 3a showing the two nuts in alined condition, and Fig. 3b showing the two nuts with their interrupted threads out of alinement;

Fig. 4 is an exploded perspective view of the various working parts of the fastener structure; and Figs. 5a and 5b are developed views of the cam and stop surfaces on the two nuts, and representing the nuts in the two positions of Figs. 3a and 3b respectively.

Referring first to Fig. 1, I have there shown a quick make and break fastener for releasably securing together superimposed portions of two plates 10 and 11. The upper plate 10 may typically comprise a removable cover plate or cowling section from a portion of the outer surface of an aircraft, which cover or cowling is adapted to be removably attached to lower plate 11. These plates preferably have registering circular apertures 12 and 13 through which the fastener extends. The fastener proper comprises a nut assembly 14 which is permanently attached to the underside of bottom plate 11, and a threaded stud or bolt element 15 adapted to extend downwardly through plate openings 12 and 13 and detachably connect to the nut assembly 14. The nut assembly is formed of a number of parts, including a housing formed of two sections 16 and 17, two movable nuts 18 and 19, an actuating element or plate 20, springs 21 for urging actuating element 20 against nut 19, and an additional spring 191.

Stud 15 has an upper enlarged diameter head portion 22 and a downwardly projecting reduced transverse dimension shank portion 23 which connects into the nut. Head 22 of the stud bears downwardly against the upper sheet 10, and may fit into an annular countersink 24 in that sheet. Shank portion 23 of the stud is of the non-circular configuration shown in Fig. 2, having two parallel flat surfaces 25 extending along two of its opposite sides and having interrupted or partial threads 26 formed along two opposite sides of the shank and circularly between flats 25. The threads 26 of the stud, and the engaging nut threads, preferably have a rather fast lead, and are of the multiple thread type, that is, there are several (typically six) threads within the axial distance that the screw advances in one turn (the lead of the screw). In tightening the fastener, stud 15 is turned in a clockwise direction as seen looking downwardly in Fig. 1, such rotation being effected by insertion of a screw driver into transverse slot 27 in head 22 of the stud. Ends 28 of the threads, which are the leading ends when the stud is turned in this clockwise tightening direction, progressively decrease in diameter toward their leading ends both at their peaks and roots to provide leading cam portions of the interrupted threads for camming the stud threads relative to the later-to-be-described nut threads, for proper engagement therewith, as the stud is turned into holding engagement with the nut threads. This reduction in diameter of the stud threads should be sufficiently great to assure that the crests of the threads at their extreme leading ends are of a diameter no greater than the root diameter *d* of the main portions of the threads.

The two sections 16 and 17 of the nut assembly body may be formed of suitable rigid sheet metal, with the upper section 17 being planar, and the lower section 16 being centrally deformed downwardly to provide a downwardly extending sidewall 29 and an inwardly extending transverse bottom wall 30 of the housing. These two portions of the housing are stationarily mounted to sheet 11 in any suitable manner, as for instance by rivets 31 extending through registering openings in sheet 11 and the two housing sections. Upper section 17 of the housing and the lower portion 30 of section 16 contain axially alined circular openings 32 through which shank 23 of stud 15 may extend and within which the shank is free for rotation.

The two nuts 18 and 19 are contained within the housing 16, 17 and are rigid and relatively strong to be capable of taking the holding forces exerted against the nuts and stud when the fastener is made up. Each of the nuts 18 and 19 has an opening 33 extending axially therethrough, and through which the stud may extend. As seen in Fig. 2, the cross-sectional configuration of each of the openings 33 within the two nuts desirably correspond essentially to the non-circular cross-sectional configuration of the shank portion 23 of the stud. Each of the openings 33 has a pair of opposite cylindrical surfaces 34 of a diameter slightly greater than the maximum diameter of stud threads 26, and of a circular extent corresponding substantially to the circular extents of those threads. Circularly between these cylindrical surface areas in opening 33, each of the nuts has two diametrically opposite series or sets of interrupted or partial threads 35, which are of a pitch, diameter and shape corresponding to and adapted to mesh with the stud threads 26. The threads 35 of the nuts terminate along lines 36, so that the stud is freely axially insertable into, and withdrawable from, the opening 33 in each of the nuts 18 and 19, when the stud is in the relative rotary position represented in Fig. 2. However, if the stud is rotated from that position in a clockwise direction relative to either of the nuts, the stud threads 26 engage with the interrupted threads 35 in the corresponding nut, to then hold the stud against such free axial movement relative to the nut.

When stud 15 is first inserted into nut assembly 14, the two nuts 18 and 19 are in rotary positions such that the interrupted threads 35 of one nut are axially alined with the interrupted threads of the other nut. This initial insertion condition is illustrated in Fig. 3a. If the stud is then turned in a clockwise direction through 90°, such turning of the stud effects a corresponding 90° rotation of nut 19 relative to the other nut 18 and the housing, to advance the interrupted threads 35 of nut 19 90° with respect to the corresponding threads of nut 18, so that the two nuts 18 and 19 then form together a composite nut adapted to threadedly engage the stud in any rotary position thereof. Fig. 3b represents the two nuts 18 and 19 when nut 19 is in this 90° advanced position. At this position, the rotation of nut 19 is stopped by suitable stop means later to be described, and further rotation of stud 15 relative to both of the nuts then causes continuing and unlimited takeup of the stud relative to those nuts as a unit.

The initial rotary shift of nut 18 relative to nut 19 is effected by means of the transverse plate or disk 20, which is provided in its upper surface with a number of upwardly projecting radially extending teeth or lugs 37 engageable in rotary driving relation with correspondingly shaped meshing teeth or lugs 38 formed on the under surface of the rotatable nut 19. Disk 20 is yieldingly urged upwardly against and into driving engagement with nut 19 by means of a spring or springs 21, which may comprise two or more annular rings of thin spring steel typically having the configuration illustrated in Fig. 1, and having sufficient resilience to advance the disk 20 and nuts upwardly through the entire range of movement of those parts. The teeth 37 and 38 formed on elements 20 and 19 respectively, are provided with slightly inclined or beveled leading and trailing sides 39, so that disk 20 will act through the teeth engagement to turn nut 19 until the stops limit further rotation of the nut, following which teeth 37 of disk 20 will slip past teeth 38 of nut 19 and allow further rotation of disk 20 without corresponding rotation of the nut.

Disk 20 is actuated directly by stud 15, and turns in correspondence with the stud as long as the latter is in its active Fig. 1 position of extension through the nut assembly. Such rotation of disk 20 with the stud is effected by providing disk 20 with a central opening 40 having a non-circular configuration corresponding essentially to the non-circular configuration of stud shank 23, to rotatively key disk 20 to the stud shank while allowing free axial movement of the stud shank into and out of the disk opening. More specifically, opening 40 in disk 20 has a pair of opposite parallel flat sides 41 engageable with the opposite sides 25 of the stud to effect the desired transmission of rotary motion of the stud to disk 20.

The upper nut 18 is keyed against rotation relative to housing 16, 17, but is free for limited axial movement relative to the housing. For thus rotatively keying nut 18 to the housing, the side wall 29 of the housing is of substantially square or other non-circular configuration (see Fig. 2), and the nut 18 is externally of corresponding substantially square or non-circular configuration. Nut 19 and disc 20 on the other hand, may be externally circular and therefore free for rotary movement in the housing. The upper nut 18 may normally be yieldingly urged a short distance downwardly from upper wall 17 of the housing, as by means of an annular spring disk 191, which bears against wall 17 and an upper transverse surface 42 of nut 18. In the completely made up condition of the fastener, nut 18 bears upwardly against spring 191 with a force completely flattening that spring, and thus taking all play out of the tightened stud and nut assembly.

As nut 19 is rotated through 90° relative to nut 18, between the Fig. 3a position and the Fig. 3b position, nut 19 is automatically displaced axially at a predetermined rate relative to nut 18. This axial displacement of nut 19 is at a controlled rate corresponding to the pitch of the stud and nut threads, and acts to always maintain the interrupted threads of nut 19 in a relation such that they form substantial continuations of the threads of nut 18, or are in what we might term "spiral alinement" with the threads of nut 18. Such axial displacement of nut 19 is effected by providing on each of the nuts a pair of diametrically opposite elongated cam surfaces 43, and a pair of shorter diametrically opposite cam surfaces 44, the surfaces 43 and 44 being disposed in series circularly about the axis of the fastener. All of these cam surfaces are curved arcuately about the fastener axis and advance axially as they advance circularly to effect the desired camming action. The surfaces 44 on each of the nuts 18 and 19 project axially beyond the intermediate surfaces 43 of the same nut, and slidably engage the surfaces 43 of the other nut (see Fig. 5). At one side of each cam surface 44, there is provided on the corresponding nut a relatively deep stop shoulder 45, which is engageable with the corresponding shoulder of the other nut in the Fig. 3b and Fig. 5b positions of nut 19 to limit rotation of nut 19 relative to nut 18 after an initial 90°. At the other side of each cam surface 44, the nuts are provided with less deep stop shoulders 46, which are engageable in the Fig. 3a and Fig. 5a positions of nut 19 to limit rotation of nut 19 relative to nut 18 in the opposite direction. Thus, shoulders 45 and 46 act to definitely limit the rotation of nut 19 relative to nut 18 at the position represented by Figs. 3a and 3b.

The rate of axial advance, or "lead," of cam surfaces 43 is desirably the same as that of cam surfaces 44, and the lead or effective pitch of both of these surfaces is desirably the same as the lead of the nut and stud threads 35 and 26. However, the lead of the cam surfaces should be in a direction which is the reverse of that of the nut and stud threads, as will be apparent from the drawings.

In discussing the operation of the fastener, assume first that nut 19 is in the rotary position of Fig. 3a in which its interrupted threads 35 are in axial alinement with the threads of the second nut 18. This position of the nuts is also represented in Fig. 1, Fig. 2 and Fig. 5a. With the nuts in this condition, stud 15 may be freely inserted into the nut assembly 14 through nuts 18 and 19 and disk 20, and to the completely inserted condition of Fig. 1. After such insertion of the stud, a screw driver is utilized to turn stud 15 in clockwise direction to a condition in which the stud and nut assembly are completely tightened relative to each other. During the first 90° of this stud rotation, the turning of disk 20 with the stud acts to engage teeth 37 and 38 to effect corresponding rotation of nut 19 relative to nut 18 and the housing. Such 90° rotation of nut 19 advances the threads 35 of that nut through 90° to the position represented at Fig. 3b, so that the threads of the two nuts 18 and 19 are then circularly complementary, and as a result the interrupted threads 26 of the stud will then engage the threads of at least one of the nuts in all rotary positions of the stud. After the first 90° of rotation of the stud has advanced nut 19 to the position represented at Fig. 3b further turning of nut 19 is prevented by engagement of stop shoulders 45 on the nuts, so that as stud 15 is turned further, the teeth 37 of disk 20 slip past teeth 38 of nut 19 to allow further turning of the stud and disk without the nut 19. It is noted that such movement of disk 20 relative to nut 19 is facilitated by the fact that when shoulders 45 are in engagement for preventing rotation of nut 19, the nut 19 has moved upwardly relative to nut 18 to a position reducing the effective force of springs 21, and thus allowing teeth 37 and 38 to pass each other more easily than in the original Fig. 1 position. The turning of stud 15 beyond the position at which rotation of nut 19 is limited is continued until nuts 18 and 19 have been tightened upwardly in a manner completely flattening spring 191 and thus taking all play out of the fastener.

In releasing the fastener, stud 15 is turned in a counterclockwise direction, until disk 20 acts through teeth 37 and 38 to rotate nut 19 through 90° to the position represented in Figs. 3a and 5a, so that the threads of the two nuts will again be in axial alinement and the stud may then be withdrawn axially outwardly from the nut assembly. During this releasing rotation of the stud, the nut 19 may under some circumstances commence to turn immediately relative to nut 18, or under other circumstances, nut 19 may remain fixed relative to nut 18 during an initial portion of the stud rotation, and then commence its 90° shifting movement. In any event, regardless of when this rotation of the nut 19 occurs, that is, regardless of whether there may be an initial slippage of disk 20, the cam surfaces 43 and 44 of nuts 18 and 19 will always maintain those nuts in such relative axial positions during their rotation as to assure proper engagement of the stud threads with the threads of both nuts. Thus, binding of either of the two nuts relative to the stud is prevented.

We claim:

1. A fastener comprising a stud having interrupted threads, two nuts one of which is mounted for rotation relative to the other between first and second positions and each having interrupted threads detachably engageable with said stud threads, said threads of the two nuts when said one nut is in said first position being alined in a relation allowing relative movement of the stud axially into and out of the nuts without meshing of the nut and stud threads, and nuts in said second position forming a composite structure whose threads mesh in holding relation with the threads of the stud in all relative rotary positions of the stud, a rotary drive connection between said stud and said one nut acting to rotate said one nut relative to the other between said positions in response to rotation of the stud, and means restraining rotation of said other nut with said one nut and said stud to thereby assure rotation of said one nut relative to the other as the stud turns.

2. Apparatus as recited in claim 1, in which said drive connection includes an element adapted to interfit with the stud in a keying relation so that rotation of the stud turns said element, and said drive correction includes means forming a slip connection between said element and said one nut for rotating said one nut relative to the other upon rotation of the stud.

3. Apparatus as recited in claim 1 in which said nut assembly includes stop means for limiting the rotation of said one nut relative to the other at said first and second positions, said drive connection including an element associated with the nuts and interfitting with the stud in a keying relation so that rotation of the stud turns said element, and said drive connection including means forming a slip connection between said element and said one nut acting to rotate said one nut with the stud and element relative to the other nut between said relative positions, said connection being constructed to then slip and allow further rotation of the stud and element without additional relative rotation of said one nut.

4. Apparatus as recited in claim 1 in which said restraining means include a non-circular housing containing said nuts, and a non-circular surface on said other nut engaging the housing and keying said other nut against rotation relative to the housing.

5. A fastener comprising a stud, two nuts one of which is mounted for rotation relative to the other between first and second positions and each engageable in holding relation with said stud during only a portion of a turn of the stud relative thereto, said stud being movable axially into and out of the nuts without meshing in holding relation therewith while said one nut is in said first relative position, said nuts in said second relative position being essentially complementary with respect to the stud to form a composite nut structure adapted to engage the stud in holding relation through a greater angular distance than in said first position, and a rotary drive connection between said stud and said one nut acting to rotate said one nut relative to the other between said positions in response to rotation of the stud.

6. A fastener as recited in claim 5, including means restraining rotation of said other nut with said one nut and said stud to thereby assume relative rotation of the nuts as the stud turns.

7. A fastener as recited in claim 5, including a housing containing said nuts, and means restraining rotation of said other nut relative to the housing and with said one nut and stud to thereby assure relative rotation of the nuts as the stud turns.

8. A fastener as recited in claim 5, in which said stud and nuts have interengageable interrupted threads.

9. A fastener as recited in claim 5, in which said composite structure formed by the nuts in said second position is adapted to engage the stud in holding relation in all relative rotary positions of the stud.

10. Apparatus as recited in claim 1 in which said drive connection includes an element adapted to be rotated by said stud and bearing against and adapted to correspondingly turn said one nut, said element having a non-circular opening adapted to receive a correspondingly non-circular portion of the stud to effect said rotation of the element with the stud, and a spring yieldingly urging said element against said one nut for effecting rotation thereof.

11. Apparatus as recited in claim 10 including stop means for limiting rotation of said one nut relative to the other at said first and second positions, said element and said one nut having releasably interengageable shoulders for transmitting rotary movement from said element to said one nut and yieldingly urged into motion transmitting relation by said spring, and said shoulders being adapted to slip past one another after rotation of said one nut to one of said positions, to thereby allow further rotation of said element without rotating said one nut.

12. Apparatus as recited in claim 1 including cam means acting to cam said two nuts axially relative to one another in response to relative rotation of said one nut between said first and second positions.

13. Apparatus as recited in claim 12 in which said cam means have substantially the same effective pitch as the nut and stud threads.

14. Apparatus as recited in claim 1 in which said two nuts have interengaging cam surfaces extending essentially arcuately about the nut axis and advancing axially as they extend about said axis, and acting to cam said one nut in a direction axially away from the other in response to rotation of said one nut from said second position to said first position, said cam surfaces having an effective pitch substantially the same as the nut and stud threads.

15. Apparatus as recited in claim 1 including cam means acting to cam said two nuts axially relative to one another in response to relative rotation of said one nut between said first and second positions, said drive connection including an element adapted to interfit with the stud in a key relation so that rotation of the stud turns said element, and said drive connection including means forming a slip connection between said element and said one nut for turning said one nut in response to rotation of said element.

16. Apparatus as recited in claim 15 including stop shoulder on said nuts acting to limit said relative rotation thereof at said first and second positions, said slip connection being constructed to transmit rotation between said element and said one nut until said stop shoulders limit relative rotation of the nuts, and then being adapted to slip and allow further rotation of the stud and element without said one nut.

17. Apparatus as recited in claim 16 in which said element comprises a plate containing a non-circular opening receiving a non-circular portion of the stud to be turned thereby, said plate bearing against said one nut, said slip connection comprising interengageable shoulders on the plate and one nut adapted to slip past one another in response to excessive load, there being a spring yieldingly urging said plate against said one nut and into rotation transmitting engagement therewith.

18. A fastener comprising a nut assembly, and a stud having interrupted threads at opposite sides thereof detachably connectable to said assembly, said nut assembly comprising a housing, a first nut contained in said housing and keyed against rotation relative thereto, a second nut in the housing rotatable relative thereto and rotatable relative to said first nut between first and second positions, said nuts having interrupted threads which in said first position of the first nut are alined in a relation allowing relative movement of the stud axially into and out of the nuts without meshing of the nut and stud threads, said nuts in said second position of the first nut forming a composite structure whose threads mesh in holding relation with the threads of the stud in all relative rotary positions of the stud, an element in the housing adapted to be rotated by the stud and to rotate said first nut with the stud, and means forming a slip connection between said element and said first nut whereby initial rotation of the former with the stud acts to rotate said first nut between said positions, following which the stud and element are free to turn further without further rotation of said first nut.

19. Apparatus as recited in claim 18 including stop shoulders limiting rotation of said first nut at said first and second positions, said slip connection comprising shoulders on said element and said first nut adapted to transmit rotation therebetween, but constructed to slip past one another under excessive load, and a spring in the housing urging said element axially against said one nut in driving engagement therewith, said element containing a non-circular opening receiving a non-circular portion of the stud to be driven thereby.

20. Apparatus as recited in claim 19 in which said first and second nuts have cam surfaces extending essentially arcuately about the nut axis and advancing axially as they extend about said axis and acting to cam said first nut in a direction axially away from the second nut in response to rotation of said first nut from said second position to the first, said cam surfaces having an effective pitch substantially the same as the nut and stud threads.

References Cited in the file of this patent

UNITED STATES PATENTS

| | | |
|---|---|---|
| 1,391,633 | Hazelton | Sept. 20, 1921 |
| 2,410,441 | Hattan | Nov. 5, 1946 |
| 2,420,733 | Connova | May 20, 1947 |
| 2,434,876 | Warren | Jan. 20, 1948 |

FOREIGN PATENTS

| | | |
|---|---|---|
| 564,108 | Great Britain | Sept. 13, 1944 |
| 642,951 | Germany | Mar. 22, 1937 |

UNITED STATES PATENT OFFICE

CERTIFICATE OF CORRECTION

Patent No. 2,807,854 October 1, 1957

Richard A. Mellen et al.

It is hereby certified that error appears in the printed specification of the above numbered patent requiring correction and that the said Letters Patent should read as corrected below.

Column 6, line 4, for "and nuts" read -- said nuts --; line 17, for "correction" read -- connection --.

Signed and sealed this 31st day of December 1957.

(SEAL)
Attest:
KARL H. AXLINE

Attesting Officer

ROBERT C. WATSON
Commissioner of Patents